Oct. 24, 1961 R. T. McMILLAN 3,005,442

DRILL HEAD ASSEMBLY

Filed Jan. 19, 1961 4 Sheets-Sheet 1

INVENTOR
Roscoe T. McMillan
BY Burns, Doane & Benedict
ATTORNEY

INVENTOR
Roscoe T. McMillan

BY Burns, Doane & Benedict
ATTORNEY

Oct. 24, 1961   R. T. McMILLAN   3,005,442
DRILL HEAD ASSEMBLY
Filed Jan. 19, 1961   4 Sheets-Sheet 3

INVENTOR
Roscoe T. McMillan

BY Burns, Doane & Benedict
ATTORNEY

Oct. 24, 1961  R. T. McMILLAN  3,005,442
DRILL HEAD ASSEMBLY
Filed Jan. 19, 1961  4 Sheets-Sheet 4
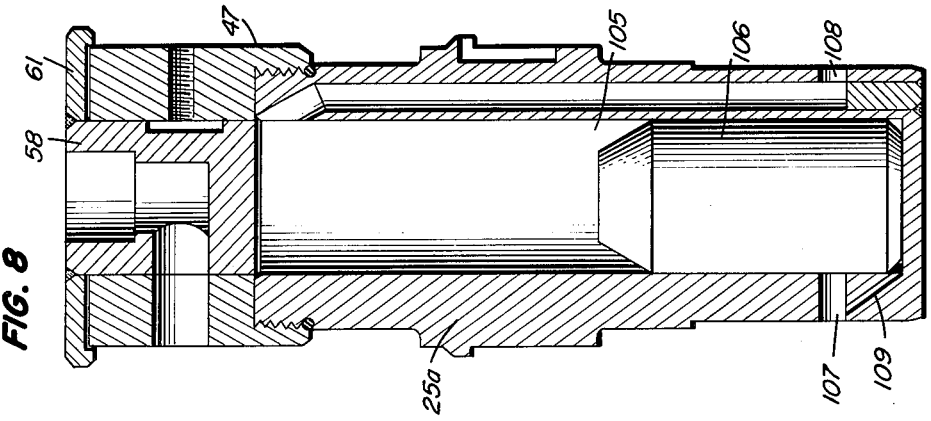
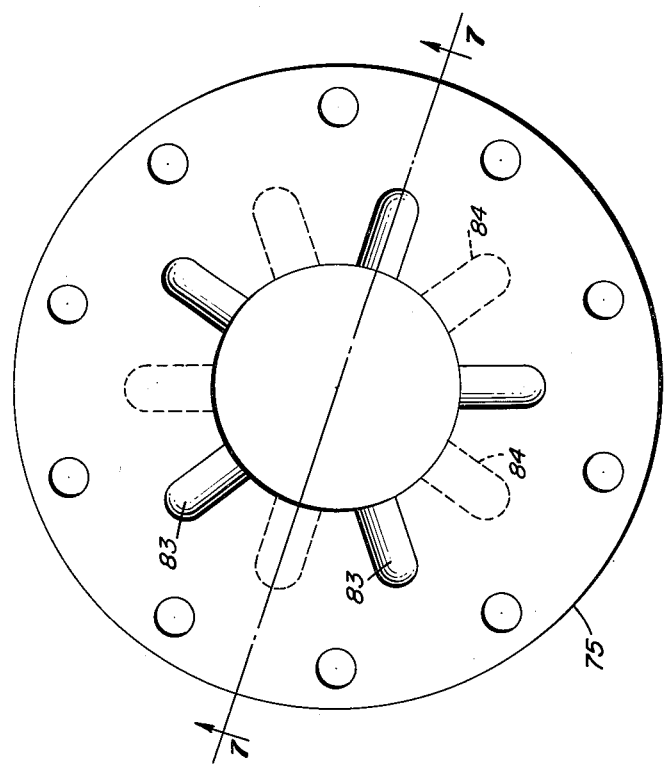
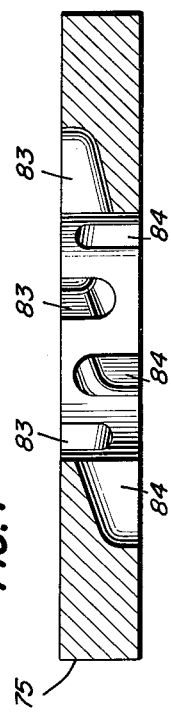
INVENTOR
*Roscoe T. McMillan*
BY *Burns, Doane & Benedict*
ATTORNEY

United States Patent Office 3,005,442
Patented Oct. 24, 1961

3,005,442
DRILL HEAD ASSEMBLY
Roscoe T. McMillan, Huntington, W. Va., assignor to Acme Machinery Company, Huntington, W. Va., a corporation of West Virginia
Filed Jan. 19, 1961, Ser. No. 83,738
12 Claims. (Cl. 121—7)

This invention relates to a drill head assembly for a power driven drill chuck to effect high speed drilling in a variety of rock formations.

It is the purpose of the invention to provide a novel drill head mechanism for effectively and concurrently imparting rotary driving force and axial percussive blows to a rock drill.

It has ascertained that most effective drilling in rock formation may be effected by suitably controlled conjoint application of rotating forces and percussive forces to the drill.

It is an object of the present invention to provide a simplified, effective drill head construction for the independent application of driving forces to effect rotation of the rock drill and to impart percussive blows thereto.

It is a further object of the invention to provide a drill head construction through the medium of which a predetermined relationship between the speed of rotation of the drill and the number of percussive blows applied thereto may be maintained irrespective of the forces applied to effect rotation of the drill, through which percussive blows may be imparted to the drill, and which permits a wide range of control over both rotary and percussive drilling forces.

It is a further and more specific object of the invention to provide a rotary percussion drill head assembly embodying a gear motor driven oversized hollow shaft having incorporated therewith a chuck housing, a dust collecting chuck and percussive mechanism which may be operated either hydraulically or pneumatically in association with valve means for the control of the operation of the percussive mechanism for maintaining the frequency of application of percussive blows to the drill directly proportional to the rotational speed thereof.

In one adaptation of the invention the independent actuating forces applied both to effect rotation of the drill and to impart percussive blows thereto may take the form of hydraulic fluid such as oil suppiled under appropriate pump pressure.

In another adaptation of the invention the independent forces applied to effect rotation of the drill and the application of percussive blows thereto may take the form of pneumatic pressure such as air supplied from suitable compressed air sources.

It is also within the purview of the invention to apply hydraulic forces to effect rotation of the drill while utilizing pneumatic pressure in the application of percussive blows to the drill and vice versa.

It is a still more specific object of the invention to provide a rock drill of the rotary percussion type of exceedingly simple design having but few operating parts. Further and more specific objects of the invention will become apparent as the description proceeds, which will be given in relation to the accompanying drawings forming a part hereof and in which:

FIGURE 6 is a side elevational view of the valve plate shown in FIGURE 5 showing the upper face of the valve plate as positioned in FIGURE 3;

FIGURE 7 is a cross-sectional view of the valve plate along the line 7—7 in the direction of the arrows as applied in FIGURE 6; and FIGURE 8 is a detailed view of the driven cylindrical drill chuck mounting applicable to the embodiment of the invention in which pneumatic pressure is employed to impart percussive blows to the drill.

Figure 2:
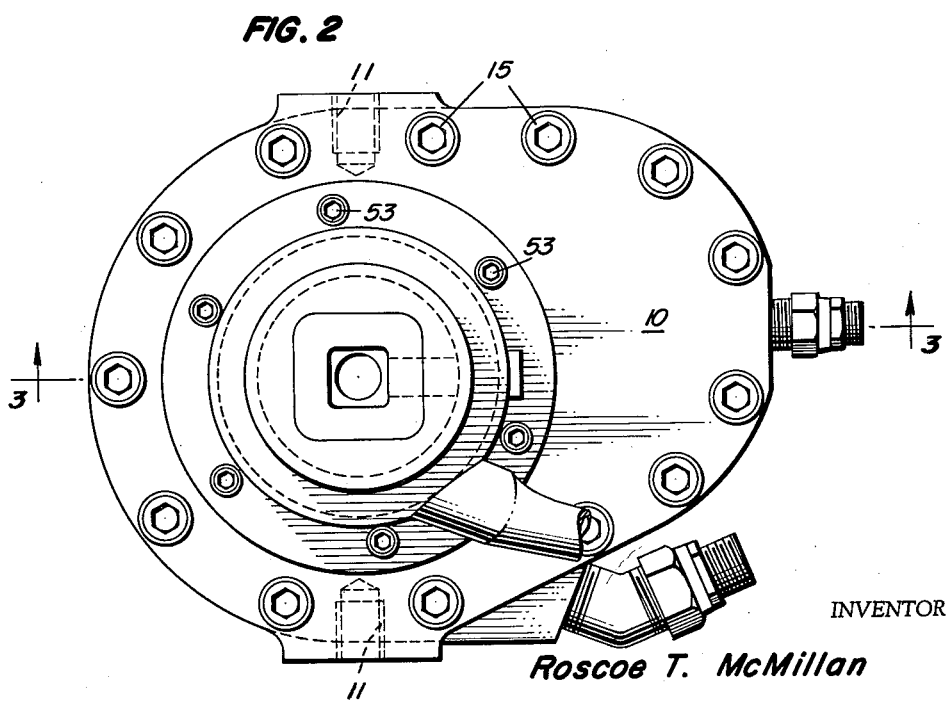
FIGURE 2 is a top elevation of the drill head housing shown in FIGURE 1, both views illustrating the housing in a position to drill upwardly.

Referring to the top plan view of the drill head assembly in FIGURE 2, the overall drill head assembly is designated by the reference character 10, which drill head assembly 10 is adapted through the medium of the trunion receiving recesses 11 to be mounted on and carried by trunions on a suitable boom, not shown, on a power driven vehicle such as is currently employed in mining practice. There is conventionally mounted on the power driven boom vehicle a source of hydraulic fluid with suitably controlled pumps for effecting circulation of the hydraulic fluid through selected hydraulic circuits under predetermined and controlled pressure. In some instances such power driven vehicles carry an air compressor for supplying appropriately controlled pneumatic pressure or alternately are provided with operative couplings to a compressed air line. It is in such an environment that the drill head assembly 10, when mounted through the medium of the trunion receiving recesses 11 on a boom, is intended for use.

Figure 1:
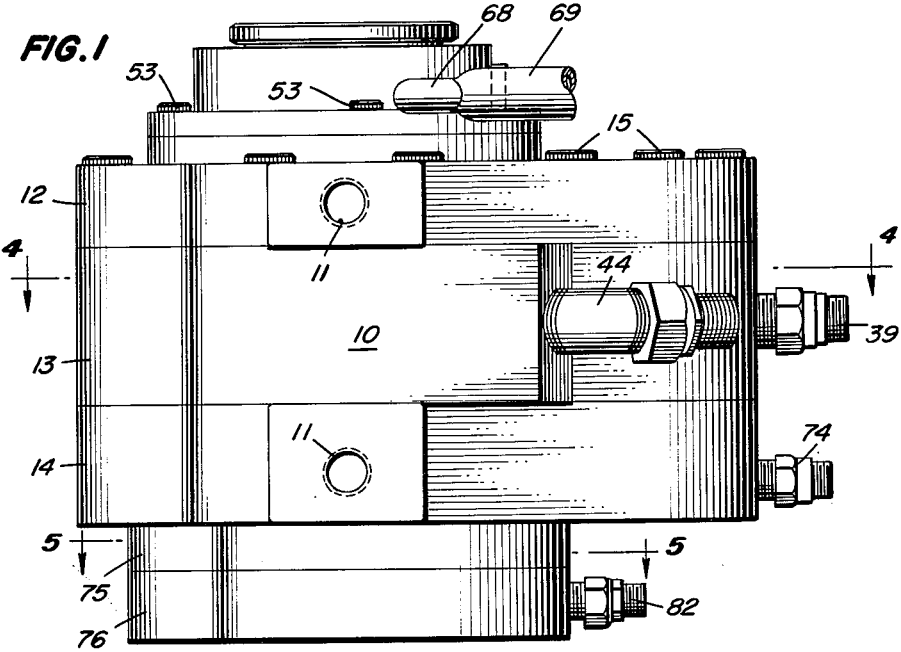
FIGURE 1 is a front elevation of the drill head housing assembly of the present invention.

The main or primary housing of the drill head assembly 10 embraces the top member 12, intermediate member 13, and bottom member 14, as positioned in FIGURE 1, each of which may be an appropriately machine casting. The members 12, 13, and 14 of the housing are held in assembled position by the stud bolts 15 which extend freely through openings 16 and 17 in members 12 and 13, respectively, and have their free ends threadedly received in threaded openings 18 in member 14, as more particularly shown at the left of FIG. 3. Annular packing glands 19 and 20 are positioned respectively between the member 13 and the member 12 and between the member 13 and the member 14.

Figure 3:
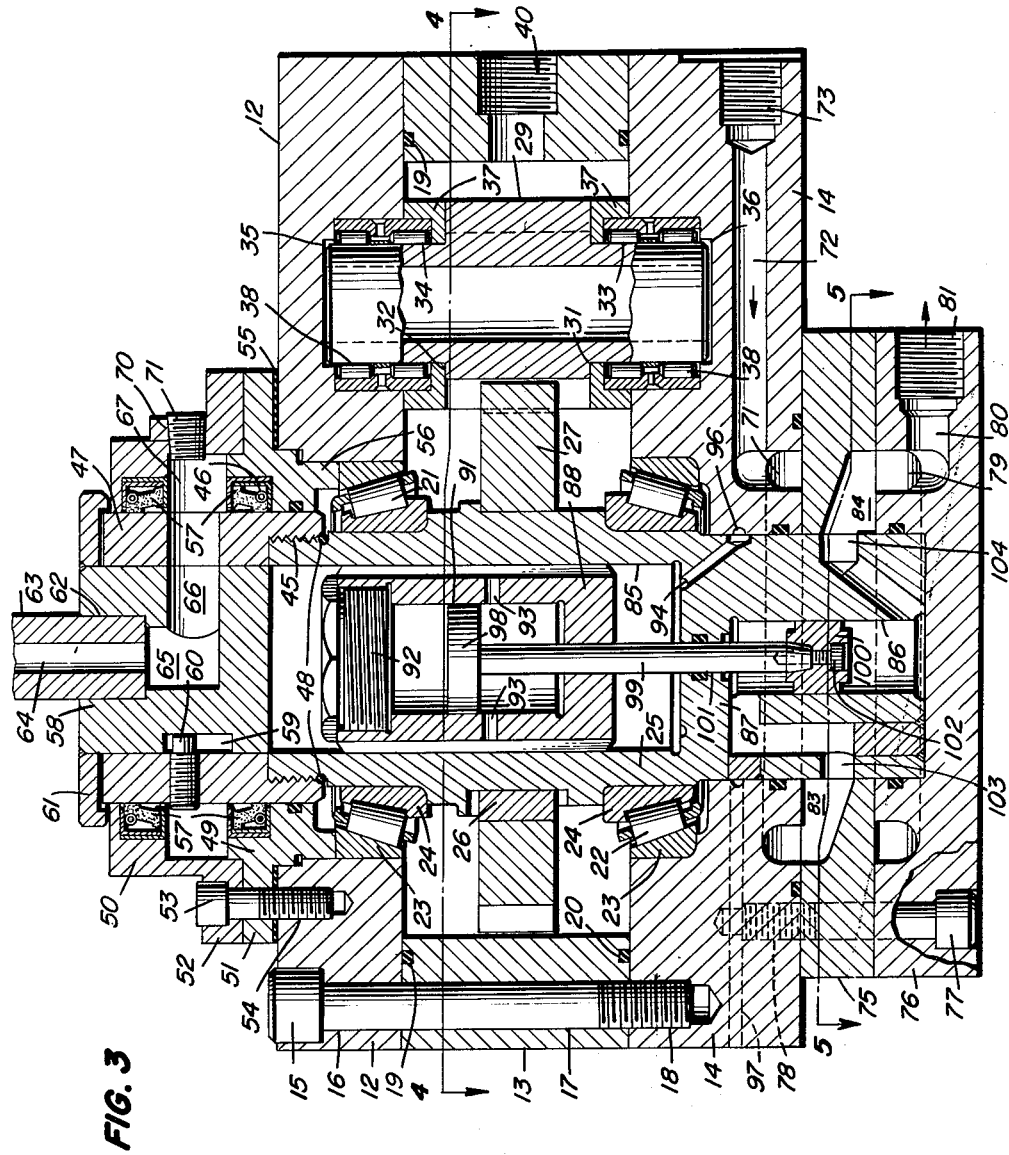
FIGURE 3 is a cross-sectional view taken along the line 3—3 as applied in both FIGURES 2 and 4.

Complemental sets of roller bearings 21 and 22 are adapted to be mounted in the members 12 and 14, respectively, between the bearing races 23 carried by the members 12 and 14 and the bearing races 24 carried on the rotatable oversized hollow shaft 25, all as more particularly illustrated in FIG. 3. Keyed to the oversized rotatable shaft 25 as indicated at 26 (FIGS 3 and 4) is an enlarged ring gear 27 having peripheral teeth 28 which mesh with the teeth 29 with one of the complemental gears 30 of a gear motor. The gears 30 of the gear motor in the illustrated embodiment are machined from specially selected tubular steel billets. The gear teeth 29 are formed along the central portion of the tubular billet between the shoulders 31 and 32 (FIG. 3), while the smaller diameter extensions 33 and 34 of each tubular billet constitute stub axles for the associated gear 30 of the gear motor. The members 12 and 14 are recessed as indicated at 35 and 36 to receive the smaller diameter extensions 33 and 34 of the tubular billets. Encircling each tubular billet at each end of the gear teeth 29 of the gears 30 are annular thrust rings 37 (FIG. 3). The thrust rings 37 serve to centrally position the gear teeth 29 of the gears 30 of the gear motor between the housing members 12 and 14. The thrust rings 37 also cooperate with the recesses 35 and 36 to house the complemental sets of roller bearings 38 within which the smaller diameter extensions 33 and 34 integral with the respective gears 30 rotate.

Figure 4:
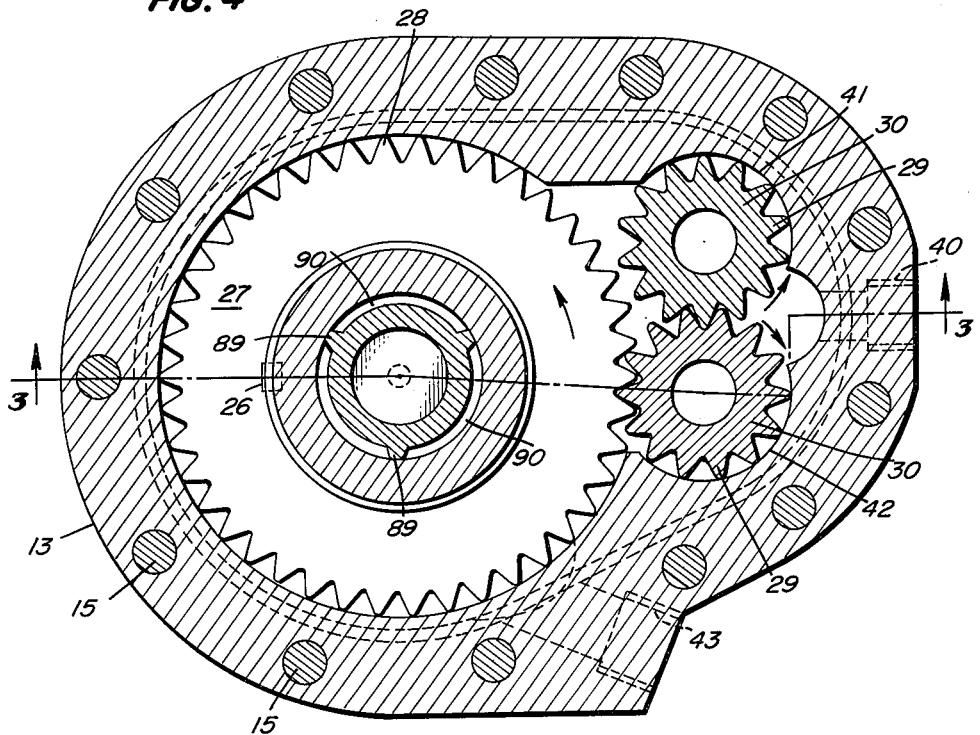
FIGURE 4 is a cross-sectional view taken along the line 4—4 in the direction of the arrows as applied in FIGURE 3.

Power to drive the gear motor comprised of the gears 30 is supplied through the inlet nipple 39 to the opening 40 in the housing member 13 which as shown in FIG. 4 is contoured at 41 and 42 to the exact diameter of the gears 30.

When power fluid is supplied to the housing assembly 10 through opening 40, the gears 30 of the gear motor will rotate in the direction of the arrows in FIG. 4, transmitting rotational drive to ring gear 27 and through ring gear 27 to oversized hollow shaft 25 in the direction of the arrow applied to ring gear 27 in FIG. 4. The power fluid employed to impel the gears 30 of the gear motor discharges from the drill head assembly 10 through the opening 43 in housing member 13 and the associated nipple 44. When a suitable power fluid, such for example as a hydraulic liquid in the form of oil, is supplied under pressure through the opening 40 in the drill head assembly 10, the gear motor comprised of gears 30 will be actuated to positively drive through the large ring gear 27 the oversized hollow shaft 25. It will be understood that when hydraulic liquid such as oil is employed to drive the gear motor comprised of gears 30, the oil will move in a closed circiut from a source of supply through an appropriate pump to the inlet opening 40 of the drill head assembly 10 and will be exhausted through the opening 43 back to the supply source such as a tank on the boom-carrying vehicle.

The upper end of the oversized hollow shaft 25 carries external threads 45 which mate with threads 46 in the drill chuck-carrying extension sleeve 47 which rotates in unison with the oversized hollow shaft 25. The O ring 48 is clamped between the sleeve 47 and the oversized hollow shaft 25.

A dust collecting structure is cooperatively associated with the drill chuck-carrying sleeve 47, embracing an annular machined ring 49 and the annular cap member 50, having flanges 51 and 52, respectively, through which stud bolts 53 extend to have their free ends threadedly received in openings 54 in housing member 12 whereby the annular machined ring 49 together with the annular cap member 50 are firmly clamped in position on the housing with a thin shim 55 disposed between the machined ring 49 and the housing member 12. A portion of the machined ring 49 projects into the central recess in the housing member 12, providing an abutment 56 for the race 23 for the roller bearing 21. An O ring is disposed between the inner surface of the annular machined ring 49 and the exterior surface of the threaded end of the chuck-carrying sleeve 47. Annular oil seals 57 are also provided, one between the annular machined ring 49 and the chuck-carrying sleeve 47 and another between the annular cap member 50 and the chuck-carrying sleeve 47. The drill chuck 58, through planar sided cooperation with sleeve 47 is interlocked with sleeve 47 for unitary rotation and has limited axial movement in the sleeve 47 provided for through the medium of the channel 59 and for the key 60. The drill chuck 58 has welded thereto an annular protective shield 61 and is recessed at 62 to receive the butt end of a section of tubular drill steel 63, the central bore 64 of which communicates with an axial bore 65 projecting from the recess 62 in the drill chuck 58. A lateral bore 66 extends radially outwardly from the bore 65 through the drill chuck 58 and the sleeve 47, communicating with the annular channel 67 disposed between the annular machined ring 49 and the annular cap member 50. The arrangement is such that when the oversized hollow shaft 25 is driven to rotate the extension sleeve 47 and drill chuck 58, the radially extending bore 66 will at all times be in communication with the annular channel 67. The annular channel 67 is provided with an exhaust port 68 to which is connected a suitable suction line 69 (FIG. 1) through which dust from the drilling face is drawn via central bore 64 in the drill steel 63, the axial bore 65, the lateral bore 66, and the annular channel 67.

An access opening 70 normally closed by threaded plug 71 is provided for access to the annular channel 67. By rotating the sleeve 47 and drill chuck 58, the key 60 can be brought into alignment with the acceess opening 70 for retraction of the key 60 to permit removal of the drill chuck 58 from the sleeve 47.

Thus far in this specification there has been described the mechanism for imparting rotary movement through the gear motor comprised of the gears 30 to the oversized hollow shaft 25, the drill chuck-receiving sleeve 47, the drill chuck 58, and the drill 63, together with the mechanism for the collection and disposition of dust through the drill chuck.

Coming now to the mechanism for imparting percussive blows to the drill chuck 58 and through the drill chuck to the drill 63, it will be noted that the lower housing member 14 is provided on its outer face with an annular channel 71 in communication through bore 72 with power fluid inlet opening 73 into which is threaded the nipple 74 (FIG. 1). Valve plate 75, which will be later described in deatil, is clamped between the outer face of the housing member 14 nad the lower end plate 76 by stud bolts 77 (FIGS. 3 and 5), the free ends of which are threadedly received in openings 78 in housing member 14. The end plate 76 is also provided with an annular channel 79 which may be slightly larger than the annular channel 71 in the outer face of housing member 14 and which, when the parts are assembled, is in axial alignment with the annular channel 71. The annular channel 79 in end plate 76 communicates through bore 80 with outlet opening 81 into which is threaded the exhaust nipple 82 (FIG. 1).

Figure 5:
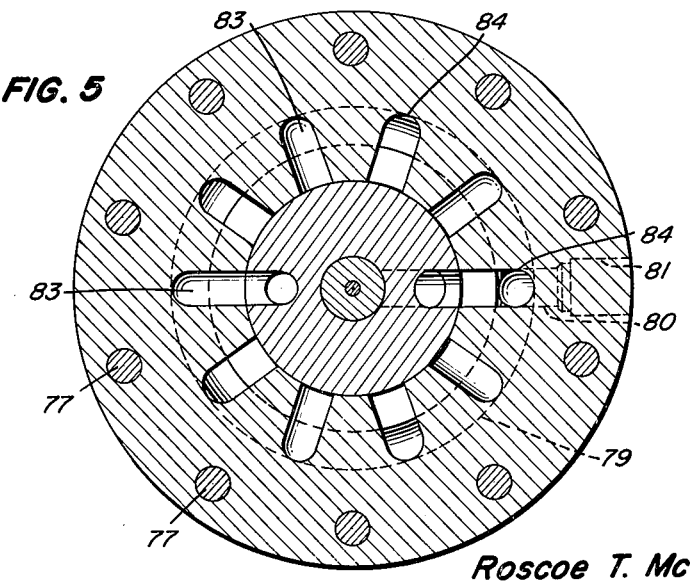
FIGURE 5 is a cross-sectional view through the valve plate for controlling the application of percussive blows to the drill, and is taken along the line 5—5 in the direction of the arrows as applied in FIGURE 1.

Coming now to the detail construction of the valve plate 75 and referring particularly to FIGS. 5, 6, and 7, it will be noted that there are five radially extending inlet openings 83 shown in full lines in FIG. 6 which are in the upper face of the valve plate 75 in the position illustrated in FIG. 1. There are likewise five radially extending outlet openings 84, shown in dotted lines in FIG. 6 on the opposite face of valve plate 75, i.e., on the bottom of that plate in the position illustrated in FIG. 1. It will be noted that each radially extending inlet opening 83 on the top face of valve plate 75 is positioned diametrically opposite its associated radially extending outlet opening 84 in the bottom face of the valve plate 75.

The radially extending inlet openings 83 are in open communication with the annular channel 71 in housing member 14 to which power fluid is supplied from a suitable source through openings 73 and bore 72. The radially extending outlet openings 84 are in open communication with the annular channel 79 in the end plate 76, which channel 79 is in open communication with the exhaust outlet nipple 82 through bore 80 and opening 81.

Returning now to the oversized hollow shaft 25 and the embodiment illustrated in FIGS. 3 and 4, it will be seen that the hollow shaft 25 is interiorally provided with the axially spaced cylinders 85 and 86 separated by the substantial transverse wall 87. The cylinder 85 is of substantially greater diameter than the cylinder 86. The end of the cylinder 85 opposite the transverse wall 87 is closed by the drill chuck 58 which may, as heretofore indicated, partake of limited axial movement through the medium of channel 59 and key 60. An air cushioned percussion hammer 88 is mounted for reciprocation in the cylinder 85. The percussion hammer 88 is provided at spaced points with radially extending ribs 89 (FIG. 4) which, upon reciprocation of the percussion hammer 88, slide along the wall of the cylinder 85 providing axially extending channels 90 intermediate the percussion hammer 88 and the cylinder 85. The percussion hammer 88 is itself provided with a cylinder 91, closed at the striking end of the percussion hammer 88 by the threaded plug 92. The wall of the cylinder 91 in the percussion hammer 88 is provided intermediate its ends with the vent openings 93 which communicate with the channels 90 intermediate the ribs 89. The end of the larger diameter cylinder 85 in oversized hollow shaft 25, closed by the wall 87, is provided with a small annular vent channel 94 communicating through an angularly extending bore 95 with annular vent channel 96 in housing member 14 which in turn is in communication with the bore 97 open to the atmosphere through housing member 14. It will thus be seen that the interior of larger diameter cylinder 85 in oversized hollow shaft 25 is at all times vented to the atmosphere and likewise kept free of any oil leakage into cylinder 85.

The percussion hammer 88 is actuated by a positively driven piston 98 in cylinder 91, connected through piston rod 99 with the piston 100 in the smaller diameter cylinder 86 in oversized hollow shaft 25, with the cylinder 86 being closed at one end by the wall 87, and at its opposite end by the bottom plate 76. Piston rod 99 reciprocates through opening 101 in wall 87 provided with a suitable packing gland. Piston 100, reciprocable in smaller diameter cylinder 86, is removably attached by the stud bolt 102 to the free end of the piston rod 99.

The portion of the circumferential wall of the oversized hollow shaft 25, surrounding and forming the wall of the smaller diameter cylinder 86, is provided with an opening 103 communicating with the end of cylinder 86, closed by wall 87, and with a diametrically opposite opening 104 communicating with the end of the cylinder 86, closed by bottom plate 76. The arrangement is such that when opening 103 is in registry with an inlet opening 83 in the valve plate 75, power fluid will be admitted to move the piston 100 in the direction of the bottom plate 76, at which time the opening 104 will be in communication with one of the outlet openings 84 to exhaust via opening 81. It will be seen that as oversized hollow shaft 25 is rotated, the openings 103 and 104, communicating with opposite ends of the cylinder 86, will be alternately brought into communication with the inlet openings 83 and outlet openings 84 in the stationarily held valve plate 75, with the result that piston 100 in cylinder 86 will be alternately power driven to move the piston 98 in cylinder 91 of percussion hammer 88 toward and away from the drill chuck 58. It will be appreciated that when the piston 98 passes the vent openings 93, it traps and compresses the air in that end of cylinder 91 of percussion hammer 88 toward which piston 98 is being driven, thus imparting movement to the percussion hammer in the direction of movement of piston 98. The stroke of piston 98 is such that it stops just short of contact by impact plug 92 with the drill chuck 58 so that the percussive blow of the percussion hammer 88 is completed by expansion of the compressed air trapped between the piston 98 and the end of the cylinder 91.

When the valve plate 75 has five inlet openings 83 and five outlet openings 84, as illustrated in the drawings, the percussion hammer 88 will be actuated to deliver five percussive blows to the drill chuck 58 for each revolution of the oversized hollow shaft 25. It will be appreciated that the number of percussive blows by the percussion hammer 88 per rotation of the oversized hollow shaft 25 is dependent upon the number of complemental inlet and outlet openings in the valve plate 75. It will be appreciated that it is a very simple matter to replace the valve plate 75 with a valve plate containing any desired number of inlet and outlet openings. This is accomplished simply by removing the stud bolts 77, bottom plate 76, and replacing valve plate 75 with a valve plate of similar construction having the desired number of complemental inlet and outlet openings.

The number of percussive blows delivered to the drill chuck 58 per rotation thereof through oversized hollow shaft 25 can thus be appropriately selected for the particular character and formation being drilled.

The fluid power circuit for actuating the percussion hammer 88 can be maintained fully independent of the fluid power circuit for actuating the gear motor comprised of gears 30 to effect rotation through oversized hollow shaft 25 of drill chuck 58, enabling a very wide range of control over the forces conjointly employed to effect rotary percussion drilling.

It will be appreciated that hydraulic fluid such as oil may be supplied through the inlet opening 40 to drive the gear motor to effect rotation of the drill chuck while concurrently pneumatic pressure in the form of compressed air may be supplied to the opening 37 to actuate the percussion hammer 88 and vice versa. In each instance the power sources are under separate and independent control.

In FIG. 8 there is illustrated a modified form of oversized hollow shaft designated 25A which may be substituted for the oversized hollow shaft 25 of the embodiment illustrated in FIG. 3. The oversized hollow shaft 25A of this embodiment receives the drill chuck extension sleeve 47 in the same manner as does the oversized hollow shaft 25 as illustrated in FIG. 3. The exterior configuration of the oversized hollow shaft 25A is exactly the same as that of the oversized hollow shaft 25. However, the internal construction is greatly simplified in that only a single cylinder 105 is provided in which the percussion hammer 106 reciprocates. In this embodiment the diametrically opposed openings 107 and 108 in the circumferential wall of the oversized hollow shaft 25A are essentially counterparts of the diametrically opposed openings 103 and 104 in the embodiment of FIG. 3 with the exception that in the modification of FIG. 8 these openings respectively communicate with opposite ends of the single cylinder 105 to alternately admit and exhaust power fluid from the cylinder 105 to effect reciprocation of the percussion hammer 106 therein. In this embodiment the percussion hammer delivers its blows directly to the drill chuck 58. A small bleed-off opening 109 bleeds from the extreme end of the cylinder 105 into opening 107 which is effective when the end of the reciprocating hammer 106 would otherwise block off opening 107. The inward taper of the striking end of the percussion hammer 106 obviates the necessity for such a bleed-off opening at the end of cylinder 105 closed by drill chuck 58. Apart from the differences herein last above noted, the mode of operation when employing the modified oversized hollow shaft 25A of the embodiment in FIG. 8 is the same as hereinbefore described for the embodiment of FIG. 3. The alternative embodiment of FIG. 8 may in some instances be preferred when pneumatic pressure is employed to actuate the percussion hammer.

From the foregoing description it will be apparent that the present invention provides a highly effective drill head assembly which, when equipped with suitable feed mechanism and power source, will provide rotary percussion drilling with a wide range of cotnrol over rotation and percussion individually and which may be readily adapted for use on existing drilling equipment having appropriate power supply sources.

Having thus described my invention, what I claim is:

1. A drill head assembly for a rock drill of the rotary percussion type comprising a housing, an elongated cylindrical member rotatably mounted in said housing, a drill carried at one end of said rotatable cylindrical member for rotation therewith, a hollow bore in said cylindrical member, a reciprocable member mounted for reciprocation in said hollow bore effective to deliver percussive blows to said drill, fluid actuated means in said housing for rotating said cylindrical member, passageways in the wall of said cylindrical member operative on rotation thereof to alternately admit and exhaust fluid to and from said hollow bore in said cylindrical member to effect reciprocation of said reciprocable member in timed relation to the rotation of said drill.

2. A drill head assembly for a rock drill of the rotary percussion type comprising a housing, an elongated cylindrical member rotatably mounted in said housing, a drill chuck carried at one end of said rotatable cylindrical member for rotation therewith, a hollow bore in said cylindrical member, a reciprocable member mounted for reciprocation in said hollow bore effective to deliver percussive blows to a drill mounted in said drill chuck, fluid actuated means in said housing for rotating said cylindrical member, passageways in the wall of said cylindrical member operative on rotation thereof to alternately admit and exhaust fluid to and from said hollow bore in said cylindrical member to effect reciprocation of said reciprocable member and deliver percussive blows to said drill chuck in timed relation to the rotation of said cylindrical member.

3. A drill head assembly for a rock drill of the rotary percussion type comprising a housing, an elongated cylindrical member rotatably mounted in said housing, a drill chuck carried at one end of said rotatable cylindrical member for rotation therewith, means to permit limited reciprocal movement of said drill chuck with respect to said cylindrical member, a hollow bore in said cylindrical member, a reciprocable member mounted for reciprocation in said hollow bore effective to deliver percussive blows to said drill chuck, fluid actuated means in said housing for rotating said cylindrical member, passageways in the wall of said cylindrical member operative on rotation thereof to alternately admit and exhaust fluid to and from said hollow bore in said cylindrical member to effect reciprocation of said reciprocable member and deliver percussive blows to said drill chuck in timed relation to the rotation thereof.

4. A drill head assembly for a rock drill of the rotary percussion type comprising a housing, an elongated cylindrical member rotatably mounted in said housing, a drill carried at one end of said rotatable cylindrical member for rotation therewith, a hollow bore in said cylindrical member, a reciprocable member mounted for reciprocation in said hollow bore effective to deliver percussive blows to said drill, a fluid actuated gear motor in said housing for driving said cylindrical member, passageways in the wall of said cylindrical member operative on rotation thereof to alternately admit and exhaust fluid to and from said hollow bore in said cylindrical member to effect reciprocation of said reciprocable member in timed relation to the rotation of said drill.

5. A drill head assembly for a rock drill of the rotary percussion type comprising a housing, an elongated cylindrical member rotatably mounted in said housing, a drill chuck carried at one end of said rotatable cylindrical member for rotation therewith, a hollow bore in said cylindrical member, a reciprocable member mounted for reciprocation in said hollow bore effective to deliver percussive blows to a drill mounted in said drill chuck, an enlarged externally toothed ring gear fixed to said elongated cylindrical member, a fluid actuated gear motor directly driving said ring gear and cylindrical member, passageways in the wall of said cylindrical member operative on rotation thereof to alternately admit and exhaust fluid to and from said hollow bore to effect reciprocation of said reciprocable member in timed relation to the rotation of said elongated cylindrical member.

6. A drill head assembly for a rock drill of the rotary percussion type comprising a housing, an elongated cylindrical member rotatably mounted in said housing, a drill chuck carried at one end of said rotatable cylindrical member for rotation therewith, a hollow bore in said cylindrical member, a reciprocable member mounted for reciprocation in said hollow bore effective to deliver percussive blows to a drill mounted in said drill chuck, an enlarged externally toothed ring gear fixed to said elongated cylindrical member, a fluid actuated gear motor consisting of a pair of intermeshing gears, the teeth of one of said intermeshing gears meshing with the teeth of said ring gear to directly drive said ring gear and cylindrical member, passageways in the wall of said cylindrical member operative on rotation thereof to alternately admit and exhaust fluid to and from said hollow bore to effect reciprocation of said reciprocable member in timed relation to the rotation of said elongated cylindrical member.

7. A drill head assembly for a rock drill of the rotary percussion type comprising a housing, an elongated cylindrical member rotatably mounted in said housing, a drill carried at one end of said rotatable cylindrical member for rotation therewith, a hollow bore in said cylindrical member, a reciprocable member mounted for reciprocation in said hollow bore effective to deliver percussive blows to said drill, fluid actuated means in said housing for rotating said cylindrical member, a valve plate surrounding a portion of said elongated cylindrical member, said valve plate having complemental sets of inlet and outlet openings, diametrically opposed openings in the wall of said elongated cylindrical member, one of which communicates with one end of said hollow bore therein and the other with the opposite end of said hollow bore, each of said diametrically opposed openings moving on rotation of said elongated cylindrical member alternately into communication with an inlet opening and an outlet opening in said valve plate to alternately admit and exhaust fluid from opposite ends of said hollow bore and effect reciprocation of said reciprocable member therein in timed relation to the rotation of said elongated cylindrical member.

8. A drill head assembly for a rock drill of the rotary percussion type comprising a housing, an elongated cylindrical member rotatably mounted in said housing, a drill chuck carried at one end of said rotatable cylindrical member for rotation therewith, a hollow bore in said cylindrical member, a reciprocable member mounted for reciprocation in said hollow bore effective to deliver percussive blows to a drill mounted in said drill chuck, fluid actuated means in said housing for rotating said cylindrical member, a valve plate surrounding a portion of said elongated cylindrical member, said valve plate having complemental sets of inlet and outlet openings, diametrically opposed openings in the wall of said elongated cylindrical member, one of which communicates with one end of said hollow bore therein and the other with the opposite end of said hollow bore, each of said diametrically opposed openings moving on rotation of said elongated cylindrical member alternately into communication with an inlet opening and an outlet opening in said valve plate to alternately admit and exhaust fluid from opposite ends of said hollow bore and effect reciprocation of said reciprocable member therein and deliver percussive blows to said drill chuck in timed relation to the rotation of said elongated cylindrical member.

9. A drill head assembly for a rock drill of the rotary percussion type comprising a housing, an elongated cylindrical member rotatably mounted in said housing, a drill chuck carried at one end of said rotatable cylindrical member for rotation therewith, means to permit limited reciprocal movement of said drill chuck with respect to said cylindrical member, a hollow bore in said cylindrical member, a reciprocable member mounted for reciprocation in said hollow bore effective to deliver percussive blows to said drill chuck, fluid actuated means in said housing for rotating said cylindrical member, a valve plate surrounding a portion of said elongated cylindrical member, said valve plate having complemental sets of inlet and outlet openings, diametrically opposed openings in the wall of said elongated cylindrical member, one of which communicates with one end of said hollow bore therein and the other with the opposite end of said hollow bore, each of said diametrically opposed openings moving on rotation of said elongated cylindrical member alternately into communication with an inlet opening and an outlet opening in said valve plate to alternately admit and exhaust fluid from opposite ends of said hollow bore and effect reciprocation of said reciprocable member therein and deliver percussive blows to said drill chuck in timed relation to the rotation of said elongated cylindrical member.

10. A drill head assembly for a rock drill of the rotary percussion type comprising a housing, an elongated cylindrical member rotatably mounted in said housing, a drill carried at one end of said rotatable cylindrical member for rotation therewith, a hollow bore in said cylindrical member, a reciprocable member mounted for reciprocation in said hollow bore effective to deliver percussive blows to said drill, fluid actuated means in said housing for rotating said cylindrical member, a valve plate surrounding a portion of said elongated cylindrical member, said valve plate having complemental sets of inlet and outlet openings, means to continuously admit power fluid to the set of inlet openings and means to continuously exhaust fluid from the set of outlet openings, diametrically opposed openings in the wall of said elongated cylindrical member, one of which communicates with one end of said holow bore therein and the other with the opposite end of said hollow bore, each of said diametrically opposed openings moving on rotation of said elongated cylindrical member alternately into communication with an inlet opening and an outlet opening in said valve plate to alternately admit and exhaust fluid from opposite ends of said hollow bore and effect reciprocation of said reciprocable member therein in timed relation to the rotation of said elongated cylindrical member.

11. A drill head assembly for a rock drill of the rotary percussion type comprising a housing, an elongated cylindrical member rotatably mounted in said housing, a drill carried at one end of said rotatable cylindrical member for rotation therewith ,a hollow bore in said cylindrical member, a reciprocable member mounted for reciprocation in said hollow bore effective to deliver percussive blows to said drill, fluid actuated means in said housing for rotating said cylindrical member, passageways in the wall of said cylindrical member operative on rotation thereof to alternately admit and exhaust fluid to and from said hollow bore in said cylindrical member to effect reciprocation of said reciprocable member in timed relation to the rotation of said drill, and independent means for supplying power fluid to said fluid actuated means to effect rotation of said drill and to said hollow bore to impart percussive blows to said drill.

12. In a sub-assembly for a rock drill head, a rotatable cylindrical member, axially spaced hollow bores in said cylindrical member, means for mounting a drill chuck to close the open end of one of said bores, means to close the open end of the other of said bores, a percussion hammer mounted for reciprocation in the bore closed by said drill chuck, a piston reciprocable in the other of said bores, fluid power supply and exhaust means operative on supply of fluid power to drive said piston on rotation of said cylindrical member and means responsive to reciprocation of said piston to actuate said percussion hammer and deliver percussive blows to said drill chuck during rotation thereof.

References Cited in the file of this patent

UNITED STATES PATENTS

| | | |
|---|---|---|
| 1,084,152 | Kessel | Jan. 13, 1914 |
| 2,019,332 | Atkins | Oct. 29, 1935 |
| 2,051,053 | Morris | Aug. 18, 1936 |
| 2,824,547 | Sherrill | Feb. 25, 1958 |
| 2,919,901 | Sandvig | Jan. 5, 1960 |